United States Patent [19]

Stocker

[11] Patent Number: 5,239,891
[45] Date of Patent: Aug. 31, 1993

[54] CAM FOLLOWER VARIABLE RATIO THROTTLE LINKAGE

[75] Inventor: Raymond Stocker, Farmington Hills, Mich.

[73] Assignee: Ford Motor Company, Dearborn, Mich.

[21] Appl. No.: 772,391

[22] Filed: Oct. 7, 1991

[51] Int. Cl.[5] .............................................. F16C 1/10
[52] U.S. Cl. ........................................ 74/513; 74/516; 74/569; 74/527; 74/526
[58] Field of Search ................. 74/513, 516, 569, 527, 74/526

[56] References Cited

U.S. PATENT DOCUMENTS

| | | | |
|---|---|---|---|
| 4,476,068 | 10/1984 | Griffin et al. | 74/513 X |
| 4,779,480 | 10/1988 | Stocker | 74/513 |
| 4,875,385 | 10/1989 | Sitrin | 74/513 X |
| 5,010,782 | 4/1991 | Asano et al. | 74/513 X |

*Primary Examiner*—Allan D. Herrmann
*Assistant Examiner*—William O. Trousdell
*Attorney, Agent, or Firm*—Jerome R. Drouillard; Roger L. May

[57] ABSTRACT

A cam and follower mechanism for connecting a vehicle accelerator pedal to an engine throttle body throttle valve for varying rates of movement of the throttle valve, including a washer-like cam operatively connected to the vehicle accelerator pedal by a pivotal connection to a cable assembly connected to the pedal, the cam having an internal surface adapted to be engaged progressively on a point-to-point basis by a one-piece tang follower to provide an infinite number of fulcrums about which the follower and throttle lever and throttle valve are forced to rotate as the accelerator pedal is progressively moved, the follower moving as the cam is pulled in one direction to thereby change the fulcrum progressively and thereby provide initially a slow rate of opening of the throttle valve in response to a large movement of the accelerator pedal, followed by a faster rate of movement of the throttle valve as the pedal moves in essentially a constant manner, to provide more nearly a movement in proportion to the angular movement of the accelerator pedal, the longitudinal axis of the cable, the pivotal connection between the cable and cam, and each fulcrum point always being aligned, to essentially eliminate binding frictional forces on the assembly.

12 Claims, 3 Drawing Sheets

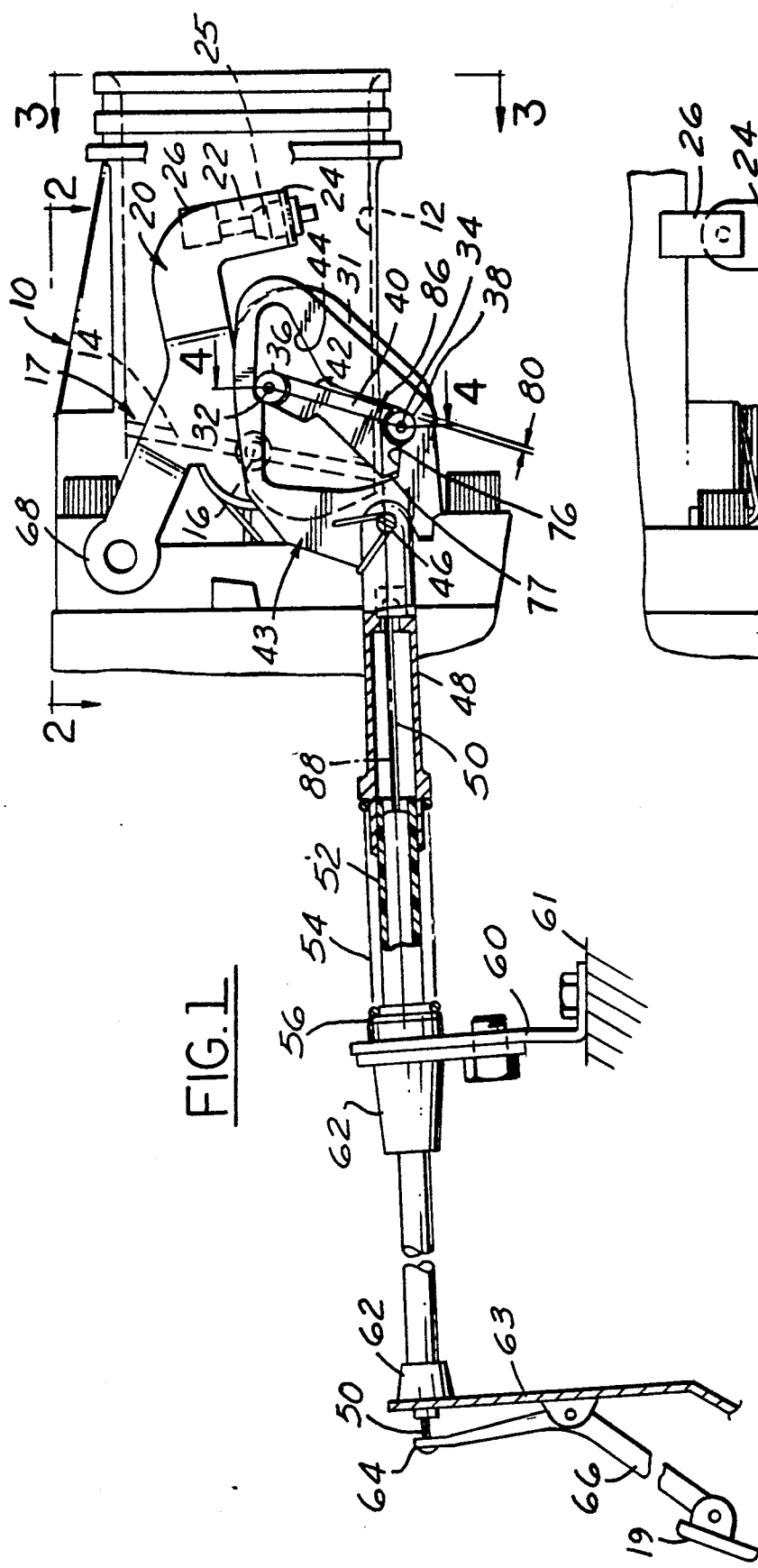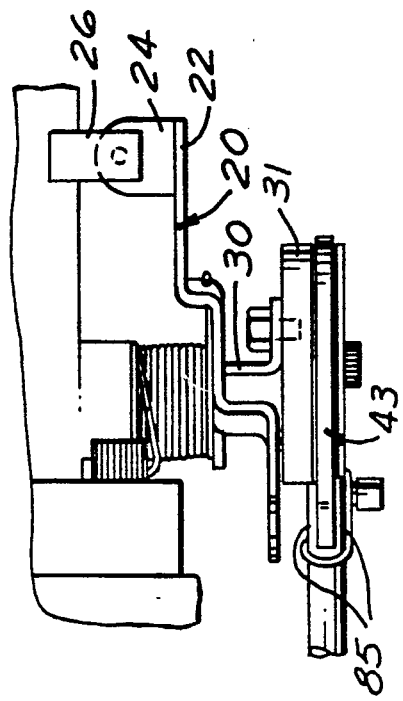
FIG.1
FIG.2

CAM FOLLOWER VARIABLE RATIO THROTTLE LINKAGE

FIELD OF THE INVENTION

This invention is a further development of the multi-ratio accelerator cable mechanism shown and described in U.S. 4,779,480.

1. Background of the Invention

The invention shown in U.S. 4,779,480 relates to a variable ratio cable mechanism for connecting a vehicle accelerator pedal to an engine throttle valve linkage. More particularly, it relates to one that provides for a slow initial rate of movement of the throttle valve in response to depression of the accelerator pedal through a large angle, followed by a faster rate of movement of the throttle valve in response to continued depression of the accelerator pedal at essentially a constant rate through its final movement. This is accomplished through the use of a simple cam and follower device secured between the cable and the throttle valve, and having a number of pivot or fulcrum points that change as a function of the position of the accelerator pedal to effect the slow initial opening movement of the throttle body throttle valve as the accelerator pedal is depressed, followed by the faster rate of opening movement of the throttle valve as the accelerator pedal is further depressed through its final opening angle.

This provides a non-linear movement, as depicted graphically, of the accelerator pedal linkage, to provide the varying rates of movement of the throttle valve as the accelerator pedal is being depressed in a uniform manner.

In my above-mentioned patent, the cam 44 is fixedly secured to the rod 46 secured through the cable 53 to the accelerator pedal, and does not pivot with respect to the same as the cable moves to change the throttle valve angle. As a result, binding frictional forces caused by the mechanism trying to seek a neutral position can produce increases in pedal efforts.

This invention provides a pivotal connection between the cam and the cable mechanism that permits the mechanism to produce greater non-linearity movements of the throttle valve and/or a more precise tailoring of the pedal to throttle opening rate curve, as graphically depicted; thereby reducing to a minimum, or essentially eliminating binding frictional forces acting on the mechanism during depression or release of the accelerator pedal moving the throttle valve.

The follower has two points of contact with the internal contoured surfaces of the cam, one point constituting a fulcrum about which the follower pivots, the other at the upper end controlling the positioning of the fulcrum. The point fulcrum contact changes or moves along the follower surface and its positioning is guided by the upper cam surface as the throttle or accelerator pedal is depressed moving the cam, thereby changing the angle of the line of action of the forces from the point of origin at the engine idle speed position.

More specifically, the pivotal connection of the cam to the cable mechanism, and the geometric construction and contour of the cam and follower are such that for each position of the cam and follower, the fulcrum point of contact therebetween, and the axis of the pivot between the cam and cable assembly, and the longitudinal axis of the cable always remain in line so that binding frictional forces during movement of the parts are essentially eliminated, and a greater non-linearity of the curve of the plot of pedal to throttle opening rate is produced.

While it is known in the prior art to have constructions providing multiple stages of operation through the use of contoured cams or pivotal connections between the cam and cable assembly, none show a construction or teach the same in which at all contact points of operation, the fulcrum point of contact between the cam and follower, the pivotal connection between the cam and cable assembly, and the longitudinal axis of the cable assembly, are in a line at all times, to reduce or essentially eliminate vertical binding frictional forces on the mechanism.

2. Description of the Prior Art

U.S. 3,490,294 to Antrim shows a cam 38 fixed to throttle shaft 56 and a lever 42 rotatable on the shaft. It has a plurality of pivots, 76 being one and 82 a second. The construction, however, requires three levers and does not provide a line of action that includes the axis of the cable linkage, its pivotal connection to the cam, and the point of contact fulcrum of the cam and cam follower.

U.S. 2,142,970 to Anderson is a non-analogous mechanical valve system in which the cable linkage is pivotally connected to the cam; however, there is no straight line of action between the cam pivot, the fulcrum contact point between the cam and cam follower, and the cable assembly.

U.S. 1,564,261 to Mathieson et al. is simply another illustration of a staged cam, follower face surface to produce changes in the movement of, in this case, a brake release mechanism.

U.S. 3,847,934 to Hemens is a push/pull cable mechanism to control a pump, with a cam that is pivotally connected to the cable linkage; however, it is fixed against movement other than rotation, and in no manner can provide a line of action in which the cam pivot, the fulcrum points of contact of the cam follower and cam surface, and the cable axis are in line.

U.S. 3,938,407 to Nisbet relates to a variable ratio parking brake control having multiple stages provided by a cam and cam follower mechanism; again, however, not being constructed to eliminate side forces or friction on the parts during operation with a straight line of action as described.

SUMMARY OF THE INVENTION

From the above, it will be clear that none of the prior art shows or teaches a construction for providing a staged operation of the engine throttle valve in a manner eliminating or materially reducing the frictional forces acting on the various parts to thereby eliminate binding between the operating parts.

It is a primary object of the invention, therefore, to provide a variable ratio throttle linkage construction in which an accelerator pedal is connected to an engine throttle valve through a cable mechanism that includes a cam and cam follower, so constructed and arranged that the line of action between the cable assembly or linkage and the fulcrum points of contact between the cam and follower always remains aligned regardless of the position of the accelerator pedal and pivotal movement of the throttle valve.

It is a further object of the invention to provide a throttle linkage of the type described above that includes a cam pivotally connected to the cable assembly that is connected to the accelerator pedal, and a follower movable by the cam and fixedly connected to the engine throttle valve operating lever to move the same upon depression or release of the accelerator pedal, the cam having a contoured surface cooperating with the follower on a point-to-point contact basis providing an infinite number of changing fulcrums between the two about which the follower pivots as the cam is moved to provide an ever-changing non-linearity to a curve of the plot of pedal movement to throttle opening rate movement.

Other objects, features and advantages of the invention will become more apparent upon reference to the succeeding, detailed description thereof, and to the drawings illustrating the preferred embodiment thereof; wherein:

BRIEF DESCRIPTION OF THE DRAWINGS

FIG. 1 a partial cross-sectional view of a motor vehicle accelerator pedal-carburetor throttle valve linkage embodying invention.

FIG. 2 is a plan view viewed in the direction of the arrows II—II FIG. 1;

DESCRIPTION OF THE PREFERRED EMBODIMENTS

Figure 3:
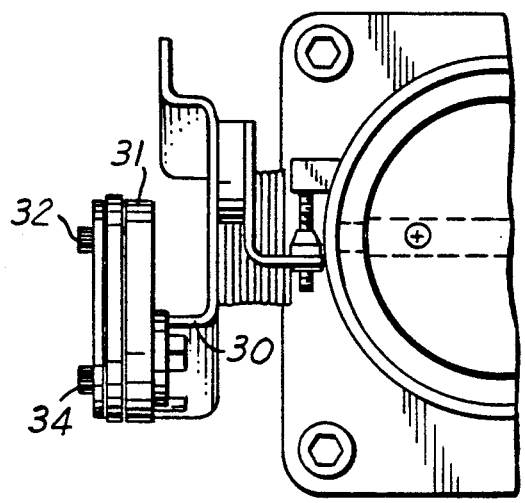
FIG. 3 is an end view of the linkage of FIG. 1 viewed in the direction of the arrows III—III of FIG. 1.
Figure 4:
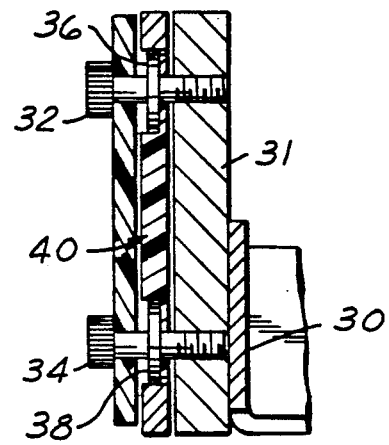
FIG. 4 an enlarged cross-sectional view of a detail of FIG. 3 taken on a plane indicated by and viewed in the direction of the arrows IV—IV of FIG. 1.

FIG. 1 shows an assembly that connects the conventional vehicle accelerator pedal to a throttle body throttle valve in a manner to be described to provide dual or multiple movement of the throttle valve with minimal frictional forces acting on the linkage. More particularly, the assembly includes a portion 10 of a conventional throttle body having the usual air/fuel induction passage 12. Flow through the passage is controlled by a butterfly or plate-type throttle valve 14. The latter is fixedly mounted on a shaft 16 that is rotatably mounted in the sidewalls of the carburetor. The valve 14 rotates from an engine idle speed closed throttle position 17 shown in FIG. 1 to a wide open throttle position 18 shown in FIG. 6.

One of the main purposes of the invention is to not only provide a variable or staged rate of movement of the throttle valve, but also to do so in a manner to essentially eliminate frictional forces that might otherwise tend to bind the linkage connecting the accelerator pedal to the engine throttle valve. An ancillary purpose is to delay or slow down the response of the throttle valve to the large initial depression of the vehicle accelerator pedal until the throttle valve reaches a predetermined opening, at which point the rate of movement of the throttle valve then is increased essentially without an increase in the rate of movement of the vehicle accelerator pedal, so that the transition from closed to wide open throttle positions is constant and uniform. This also is accompanied by the construction essentially eliminating vertical binding frictional forces on the linkage to permit a more accurate control of the opening movement of the throttle valve compared to prior constructions, since the initial slow rate of movement of the throttle valve, in response to a large travel of the accelerator pedal and corresponding cable linkage, can provide a finer tuning of the movement of the throttle valve compared to that of the prior art.

Returning now to FIG. 1, fixedly attached to throttle valve shaft 16 is a bell crank lever 20. The upper arm or end 22 of the lever is bent and provided with a right angled flange 24 equipped with a threaded screw 25. The latter is engaged with an idle speed stop 26. As best seen in FIG. 2, the throttle lever has a bifurcated finger-like portion 30 to which is attached a mounting plate 31. Extending outwardly from the plate are a pair of spaced pins 32, 34. A pair of rollers 36, 38 are mounted on the pins respectively, the pins being interconnected by a one-piece tang 40. The latter has a contoured perimeteral surface 42, for a specific purpose to be described.

The one-piece rectangular-like tang 40 constitutes a follower that is movable within the hollow interior of an oval-shaped cam 43. The cam has a roundish or washer-like appearance with, as stated, a hollow interior or slot provided with a specifically contoured surface 44. The latter is contiguous, on a point-to-point basis, at all times with the follower 40 in a manner to be described. The point-to-point contact defines a different pivot point or fulcrum on the follower as it is forceably pivoted about the contoured surface 44 as the cam moves leftwardly upon depression of the accelerator pedal in a manner to be described.

The cam 43 at its leftward edge is pivotably connected by a pin 46 to the end of a sleeve 48. The latter constitutes a dust shield for protection of a Bowden wire-type cable 50 that is fixedly mounted within the sleeve. The Bowden wire projects through a spring guide 52 which also slidably receives the cup-like end of the sleeve 48. A compression spring 54 is seated at one end on a flange 56 on the spring guide, and at its other end presses against the sleeve 48. A bracket 60, mounted on the engine at 61, supports the cable and spring guide assembly, and acts as an anchor or flexible joint to serve as a pivot point for the cable, cable guide and dust tube. The Bowden wire cable further extends through a fitting 62 that is anchored to the engine fire wall 63, the cable continuing for attachment to the upper end 64 of the vehicle accelerator pedal bell crank lever 66, as shown.

As an alternative, a throttle valve tension return spring, not shown, could be used in place of the compression spring 54. It would be attached to the engine bracket at 61, with the opposite end secured to the crank arm portion 68 of throttle lever 20.

Completing the construction, the cam 43 is provided with an idle return seating spring 70, one arm being secured to the sleeve 48, the other being fixed to the cam. The cam 43 is provided on its upper interior surface with an idle stop seat 72. The follower also is provided with a cooperating projection 73, having a flattened face 74 adapted to seat against the mating portion 76 on the cam 43 for the idle speed position of the throttle valve. A further idle speed stop is provided by abutting of the face 77 of the follower projection 73 against the mating face 78 of the cam. The spring 70 urges cam 43 against the follower 40 to urge the same against the idle speed stops at 72, 74 and 76. This minimizes tip-in pedal lost motion upon initial depression of the accelerator pedal to open the throttle valve.

A very small clearance 80 between the cam contoured surface 44 and the adjacent follower surface 42 when in the idle speed position shown in FIG. 1 provides this minimum tip-in, lost motion pedal travel. This is caused by the loading of the cable compression return spring 54. During accelerator pedal tip-in, the movement of follower 40 transfers this clearance 80 to the faces 77 and 78 of the cam and follower projection.

The cam also includes a pair of anti-rotational stops 82 and 84 positioned on opposite sides of the yoke-like end 85 of the sleeve 48, which prevents unlatching or overstressing of spring 70 before vehicle installation, and also facilitates vehicle assembly.

An important feature of the invention, as will become more clear later, is that the line of action and the cable compression spring loading in the opposite direction maintains the longitudinal axis 88 of the cable and the axis of the pivot 46 always in line with the point of contact of the follower 40 and the cam contoured surface of the cam 43, so that binding frictional forces acting on the mechanism are essentially eliminated. Stated otherwise, the contact of cam 43 with follower 40 is at a point that is always in line with a line through the axis of pivot 46 and the longitudinal axis 88 of the cable 50, the latter of which pivots about the flange or bracket 60 as a pivot point.

Before proceeding to the operation, it will be clear that a leftward pull of cable 50 will cause a likewise leftward movement of cam 43 about the pivot 46. Since the follower 40 is fixedly attached to throttle lever 20 and throttle shaft 16, the follower will be forceably moved about the contoured surface of cam 43 as it moves leftwardly. Simultaneously, the cam is guided in its movement by the contact of the upper roller 36 with the cam surface. Therefore, upon continuous leftward movement of the cable and cam, the fulcrum point of pivoting of the follower will continuously change, as allowed by the upper cam surface, thereby varying the rate of movement of the throttle valve as a function of the overall contour of the cam to provide an infinite number of different stages of variable rate movement In operation, therefore, depression of accelerator pedal 19 will draw the cable 50 leftwardly, as seen in FIG. 1, to move the sleeve 48 and cam 43 in the same direction. The cam surface 44 contacting follower 40 now moves the latter leftwardly, it pivoting on its fulcrum about point 86 (FIG. 1), which corresponds to the engine idle speed throttle valve position, as shown in FIG. 1. As the movement continues, the cam 43 pivots about its pivotal connection 46 to the dust tube to always maintain the line of action through the axis 88 of the cable, the pivot point 46, and the particular point of contact or fulcrum of the follower at the moment with the contoured surface of cam 43.

Continuous movement leftwardly of cable 50 then continuously shifts the point of contact/fulcrum as the follower continues to pivot clockwise and varies the distance between the new fulcrum and the throttle shaft 16. This continuously varies the rate of angular opening of the throttle valve as the distance of travel of the accelerator pedal changes. This is evidenced by the position of the follower in FIG. 5 as it moves progressively to progressively open the throttle valve.

Figure 5:
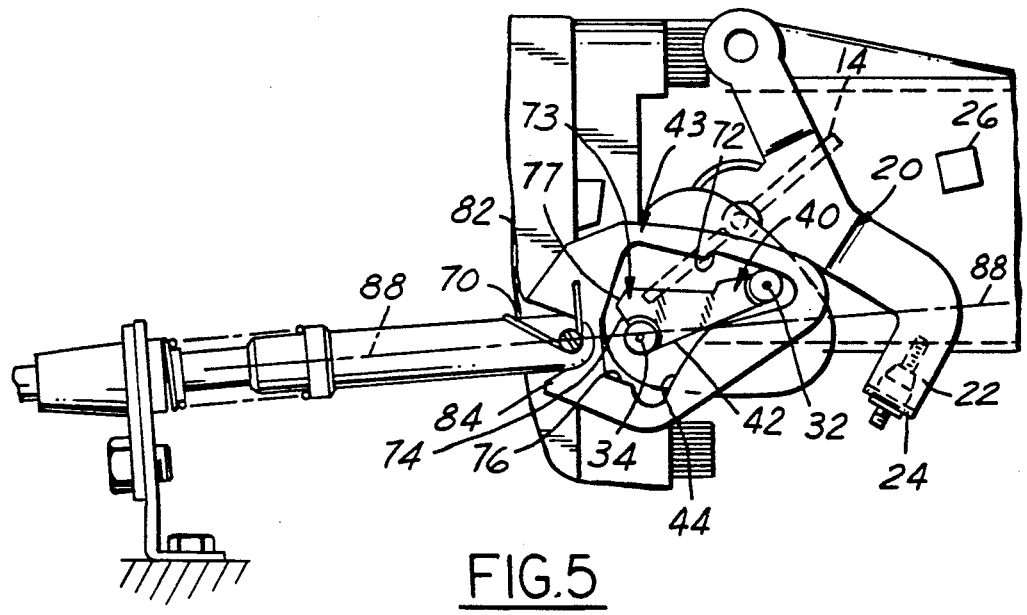
FIGS. 5 and 6 are similar to the showing in FIG. 1, indicating the parts in different operative positions.
Figure 6:
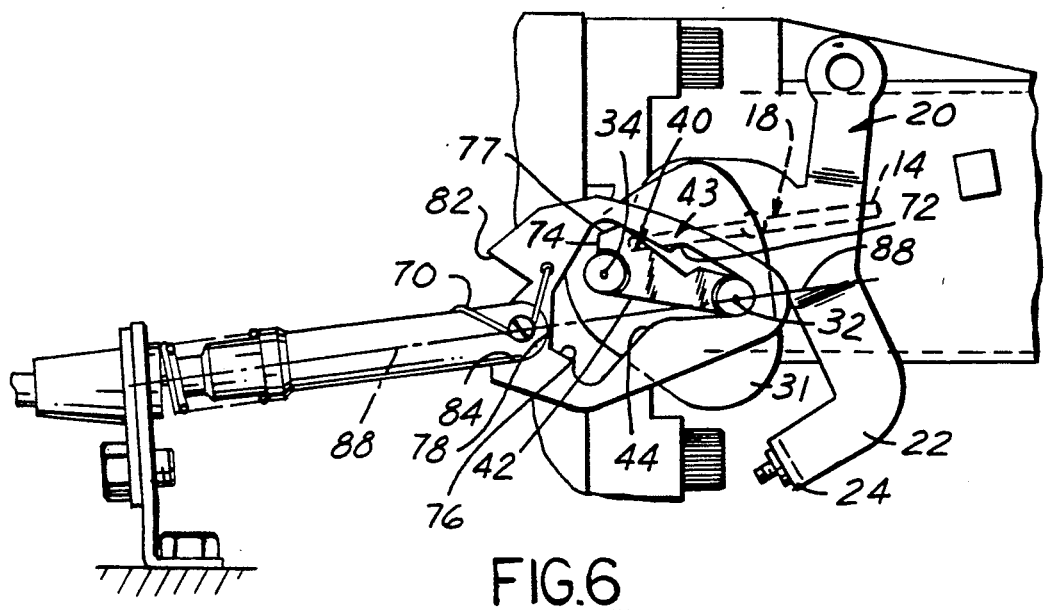

As seen in FIG. 5, the follower will linger temporarily near its midpoint fulcrum before continuing to shift the fulcrum to the wide open throttle position shown in FIG. 6. Of course, release of the vehicle accelerator pedal 19 towards the closed throttle valve position will cause a movement of the parts in operation in reverse; i.e., throttle valve 14 first will move counterclockwise at a fast rate as the follower self rotates counterclockwise from torque produced from its torsion return spring, not shown, to the changeover position shown in FIG. 5, followed by a slower pivotal movement of the throttle valve and lever 20 to the initial idle speed position of FIG. 1 as the fulcrum changes from point to point along its perimeteral contact surface.

Figure 7:
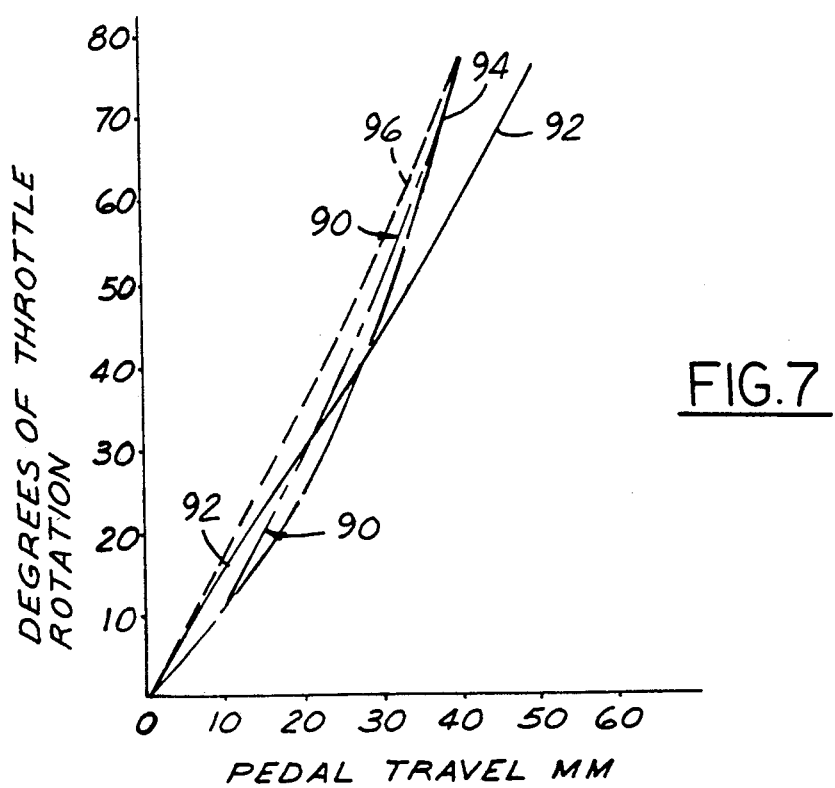
FIG. 7 is a graph comparing angle of engine throttle valve rotation versus accelerator pedal travel for the device of the invention and other constructions.

The graph in FIG. 7 illustrates the change in pedal travel versus throttle angle for the various positions of the follower. Curve 90 illustrates the changes for the embodiment of the invention thus far described. An initial opening movement of a 10 mm. pedal travel causes approximately a 10° throttle valve angle. In contrast thereafter, each incremental opening of the throttle valve is accompanied by a lesser increment of pedal travel up to the wide open throttle position.

Curve 92 illustrates the rate of change of the throttle angle with pedal travel of a current commercially available engine. As will be seen, the curve is essentially linear in nature. Curve 94 illustrates a different rate change curve, a progressive cam/pulley type of arrangement in which the connection from the accelerator pedal to the throttle valve is by way of a pulley, and the connection is off-center, causing it to have a cam action.

The advantage of the present invention is that it provides a staged throttle valve operation with essentially a constant movement of the throttle pedal, in contrast to known constructions. It will be clear, of course, that the opening rate of the throttle valve and/or pedal travel can be changed merely by modifying the contour of the cam profiles. In contrast, curve 96 illustrates the change in curve 92 from reducing the pedal arm ratio only.

The contour will control the slow initial opening rate and limit the range of slowing, as desired. Many other options, of course, are also available by changing the various geometrical pivot points, so long as the line of action through the axis of the cable, the pivotal connection of the cable to the cam, and the point of contact of the follower and cam remains aligned. The use of roller 36 on the upper end of follower 40 may be used to reduce a scrubbing or sliding action that otherwise might result in excessive frictional losses. The lower roller 38 may be omitted, if desired, since normally it does not contact the cam and would not play a part in limiting friction except under limited operating conditions.

From the foregoing, it will be seen that the invention provides an accelerator pedal linkage that includes a cam follower variable ratio throttle mechanism that provides an infinite number of staged movements of the throttle valve as a function of movement of the accelerator pedal, and that this is accomplished by maintaining the line of action of forces through the longitudinal axis of the cable, the axis of the pivotal connection between the cable and cam, and the point of contact or fulcrum of the follower with the cam surface in line at all times.

While the invention has been shown and described in its preferred embodiment in the drawings, it will be clear to those skilled in the arts to which it pertains, that many changes and modifications may be made thereto without departing from the scope of the invention.

I claim:

1. In combination, in a motor vehicle, a vehicle accelerator pedal, an air/air-fuel throttle body, the body having an air/air-fuel induction passage and a throttle valve shaft rotatably mounted therein and having a throttle valve fixed thereto, and a throttle lever fixed on the shaft for concurrent movement with the throttle valve, the throttle valve being pivotally movable between positions variably opening and closing the induction passage, and a cable assembly operatively connecting the accelerator pedal to the throttle valve, with the cable assembly comprising a cable operatively pivotally connected at one end to the accelerator pedal at a point adjacent the accelerator pedal for pivotal movement of a portion of the longitudinal axis of the cable about the point, a washer-like cam operatively pivotally connected to the other end of the cable, the cam having an internal cam slot defining an internal contoured cam surface, and follower means fixed on the throttle lever for movement therewith and received within the cam slot to be guided in its movement and having a portion thereof having a fulcrum point of contact with the cam surface to be moved thereby upon movement of the cam, depression of the pedal moving the cable and cam in one direction forcing the follower means to rotate about the throttle valve shaft by its point of contact with the cam as a fulcrum to rotate the throttle valve lever and valve, continued depression of the accelerator pedal progressively engaging other points of contact on the follower means individually with the cam surface to constitute each a further fulcrum for a different timed pivotal movement of the follower means to further move the throttle lever to rotate the throttle valve to other positions, the point of contact of the follower means with the cam surface at all times being aligned with a line of action extending through the pivotal connections of the cable both to the cam and to the pedal at the point adjacent the pedal to minimize binding frictional forces on the assembly and provide a precis relationship between depression of the pedal and movement of the throttle valve.

2. A cable assembly as in claim 1, wherein each fulcrum point of contact of the follower means with the cam contoured surface becomes aligned with the line-of-action through a portion of the longitudinal axis of the cable as the pedal is progressively depressed.

3. An assembly as in claim 1, wherein the cam follower means comprises a one-piece tang and the cam surface is contoured for cooperation with the tang surface to provide an infinite number of fulcrum points as the follower means is progressively moved.

4. In combination, in a motor vehicle, a vehicle accelerator pedal, an air/air-fuel throttle body, the body having an air/air-fuel induction passage and a throttle valve shaft rotatably mounted therein and having a throttle valve fixed thereto, and a throttle lever fixed on the shaft for concurrent movement with the throttle valve, the throttle valve being pivotally movable between positions variably opening and closing the induction passage, and a cable assembly connecting the accelerator pedal to the throttle valve, with the cable assembly comprising a cable operatively pivotally connected at one end to the accelerator pedal at a point adjacent the accelerator pedal for pivotal movement of a portion of the longitudinal axis of the cable about the point, a movable roundish cam having a central opening defined by a contoured surface, the opening receiving and guiding a movable follower for movement therein having an outer perimeteral surface with a plurality of parts sequentially engagable with the contoured surface in a manner providing only a single fulcrum point of contact at a time with the contoured surface during movement of the cam, pivot means operatively connecting the cam to the other end of the cable, means fixedly connecting the follower to the throttle lever or unitary movement, each point of contact of the follower with the cam, and the axis of the pivot means, and the portion of the longitudinal axis of the cable all being in alignment at all times to minimize binding frictional forces acting on the assembly upon depression of the accelerator pedal moving the cam to force movement of the follower and lever and throttle valve at different rates of movement of the follower as a function of contact of the follower with the contour of the cam surface.

5. An assembly as in claim 4, wherein the follower comprises a one-piece tang providing the perimeteral surface with an infinite number of contiguous sequentially engagable points of contact with the cam.

6. An assembly as in claim 4, wherein the cam is essentially washer-like in appearance, and the follower is essentially rectangular in shape and fixedly secured to the throttle lever at a plurality of spaced points on the follower.

7. An assembly as in claim 4, wherein assembly of the cable other end and contiguous cam portion pivoted thereto includes a yoke-like portion and anti-rotational stops radially spaced from and straddling the yoke-like portion to limit the pivotal movement of the cam relative to the cable.

8. An assembly as in claim 4, wherein the follower perimeteral surface includes a projection engagable with the cam contoured surface at times to limit the movement of the cam beyond an engine idle speed position in the throttle valve closing direction.

9. An assembly as in claim 4, including spring means biasing the cam against the follower at times.

10. An assembly as in claim 4, the cable assembly including anchor means anchoring the cable at one end adjacent the connection to the accelerator pedal to define a flexible joint at the one end, a movable dust tube-like sleeve surrounding the cable and fixedly connected to the cable at its other end, and spring means between the anchor means and sleeve biasing the sleeve and cable and cam and follower in a throttle valve closing direction.

11. An assembly as in claim 4, wherein the linear movement of the cable assembly at essentially a constant rate by pivoting of the vehicle accelerator pedal from an initial at-rest engine idle speed position initially effects an arcuate pivotal movement of the throttle lever and throttle valve at a first rate of movement by the engagement of and the forced arcuate pivotal movement of one of the follower parts by the one cam surface thereagainst about the follower part as a fulcrum, followed by an arcuate pivotal movement of the throttle lever and throttle valve at a second rate of movement by the engagement of and the forced arcuate pivotal movement of follower parts as a fulcrum by the cam surface against the other follower part.

12. An assembly as in claim 4, wherein the follower includes roller means on one of the opposite ends of the follower engagable with the cam contoured surface.

* * * * *